United States Patent
Ware et al.

(10) Patent No.: US 7,975,421 B2
(45) Date of Patent: Jul. 12, 2011

(54) REMOTE CONTROL DECOY

(75) Inventors: Brett Ware, Marysville, MO (US); John Iden, Platte City, MO (US)

(73) Assignee: Ultimate Hunter Corp., Maryville, MO (US)

( * ) Notice: Subject to any disclaimer, the term of this patent is extended or adjusted under 35 U.S.C. 154(b) by 1623 days.

(21) Appl. No.: 10/896,239

(22) Filed: Jul. 21, 2004

(65) Prior Publication Data

US 2006/0016115 A1     Jan. 26, 2006

(51) Int. Cl.
*A01M 31/06* (2006.01)
(52) U.S. Cl. .............................................. 43/3
(58) Field of Classification Search .............. 43/2, 3
See application file for complete search history.

(56) References Cited

U.S. PATENT DOCUMENTS

| | | | | |
|---|---|---|---|---|
| 2,195,745 A * | 4/1940 | Gariepy | | 43/3 |
| 2,443,040 A * | 6/1948 | Jones | | 43/3 |
| 2,726,469 A * | 12/1955 | Becker | | 43/3 |
| 3,689,927 A * | 9/1972 | Boston et al. | | 213/3 |
| 4,322,908 A * | 4/1982 | McCrory | | 43/3 |
| 4,612,722 A * | 9/1986 | Ferrell | | 43/3 |
| 5,377,439 A * | 1/1995 | Roos et al. | | 43/3 |
| 5,581,932 A * | 12/1996 | Bell | | 43/26.1 |
| 5,636,466 A * | 6/1997 | Davis | | 43/3 |
| 6,321,480 B1 * | 11/2001 | Solomon | | 43/3 |
| 6,412,209 B1 * | 7/2002 | Kapraly et al. | | 43/3 |
| 6,412,210 B1 * | 7/2002 | Horrell | | 43/3 |
| 6,460,284 B1 * | 10/2002 | Rabo | | 43/3 |
| 6,553,709 B1 * | 4/2003 | Owen | | 43/3 |
| 6,601,333 B2 * | 8/2003 | Cicoff et al. | | 43/2 |
| 2003/0061754 A1 * | 4/2003 | Cicoff et al. | | 43/2 |
| 2004/0025770 A1 * | 2/2004 | Saunoris et al. | | 114/144 A |

* cited by examiner

*Primary Examiner* — Darren W Ark
(74) *Attorney, Agent, or Firm* — Brett Trout

(57) ABSTRACT

A remote controlled decoy is provided. The remote control decoy operates using two propellers secured to a hull and remotely controlled by a radio frequency transmitter. A shell resembling a particular waterfowl is releasably coupled to a hull which serves as a watertight compartment for the receiver and the electronics associated with the propulsion of the decoy. The decoy may also be provided with strobe lights to draw attention to the decoy from passing waterfowl.

18 Claims, 6 Drawing Sheets

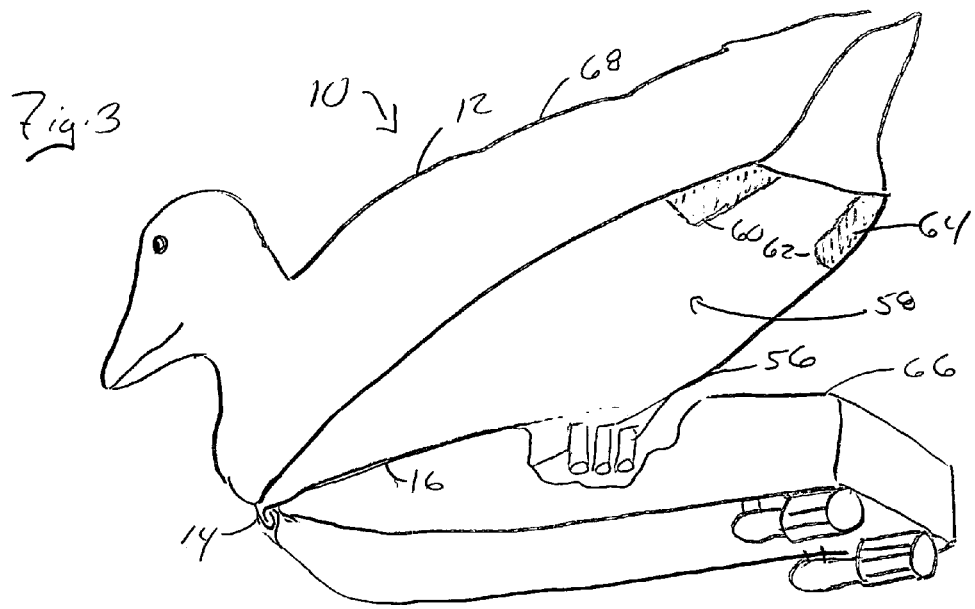
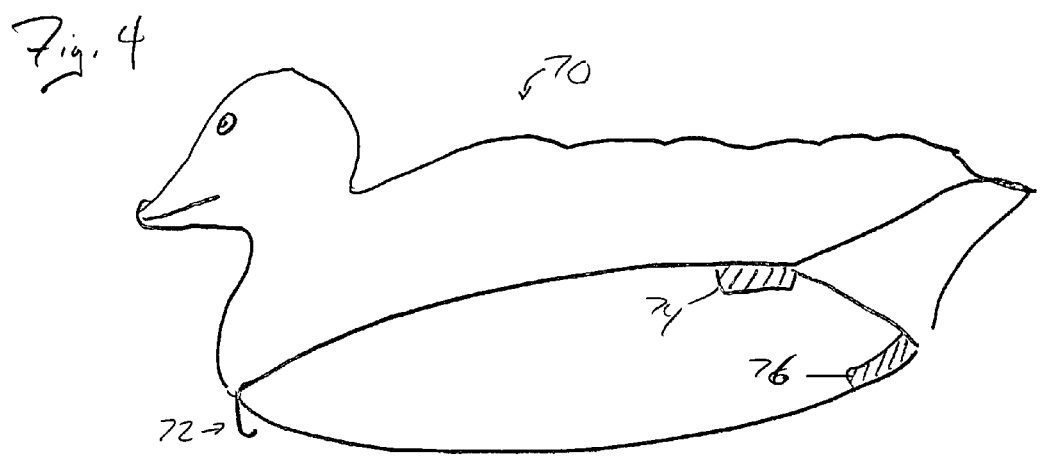

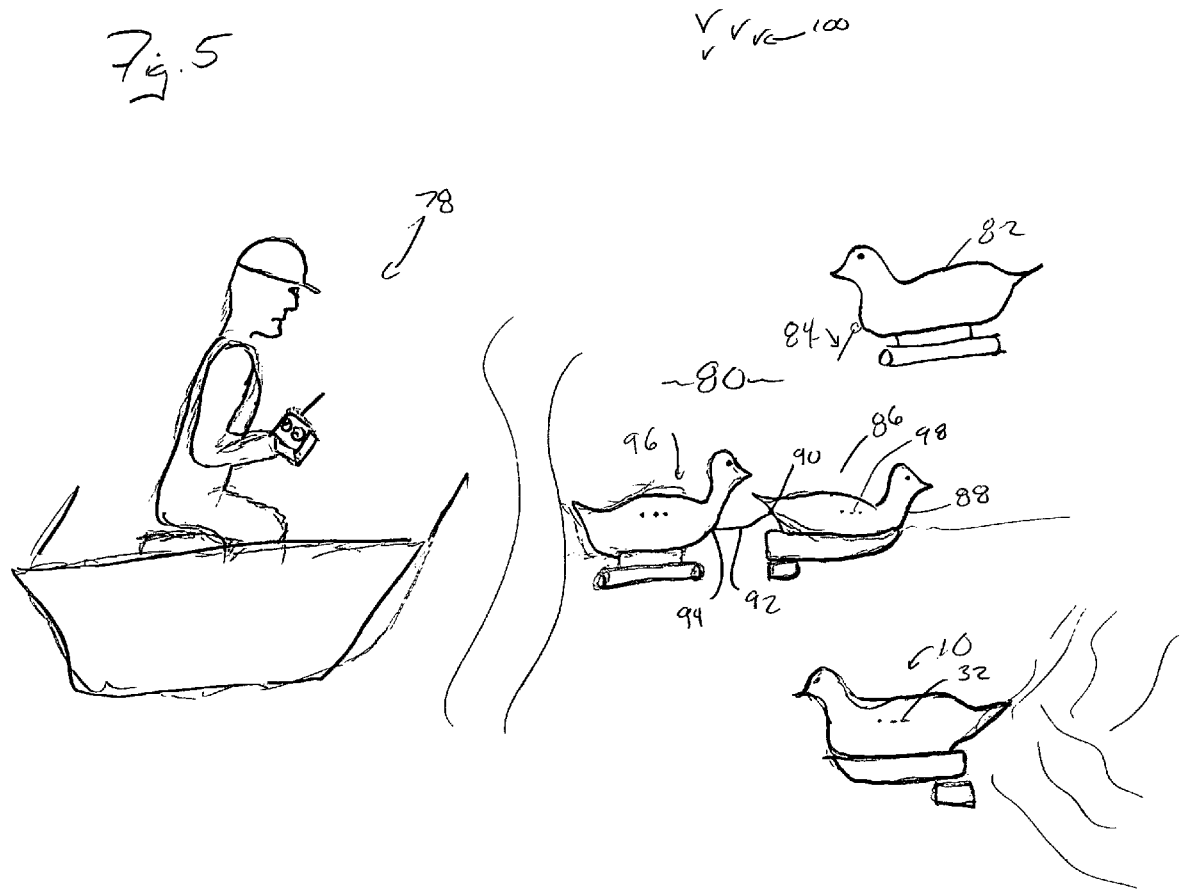

REMOTE CONTROL DECOY

BACKGROUND OF THE INVENTION

1. Field of the Invention

The present invention relates in general to a remote control decoy and, more specifically, to a radio controlled decoy with improved maneuverability and waterfowl attraction capabilities.

2. Description of the Prior Art

It is well known in the art to provide decoys of various types to attract game to a hunter. When hunting waterfowl, it is often desirable to utilize floating decoys. While such decoys are useful for attracting game, they have several important drawbacks. Drawbacks include the large number of decoys required, the difficulty in setting and retrieving the decoys, the disruption of the habitat during the critical period of time when the decoys are set, the unrealistic motion of the decoys, and the inability of such decoys to attract waterfowl from great distances.

It is known in the art to provide remote controlled decoys such as that shown in U.S. Pat. No. 5,377,439 to Roos, et al. Such remote control decoys avoid the disadvantages associated with setting and retrieving the decoys, and somewhat reduce the number of decoys needed. However, the disadvantages associated with using multiple transmitters, the requirement of additional units for different species of waterfowl, the difficulty in attracting waterfowl from large distances, and low maneuverability remain. It would, therefore, be desirable to provide a decoy which further reduced the number of decoys required, added more realistic maneuverability to the decoy, and was capable of drawing waterfowl from great distances. The difficulties encountered in the prior art discussed hereinabove are substantially eliminated by the present invention.

SUMMARY OF THE INVENTION

In an advantage provided by this invention, a remote control decoy is provided with improved maneuverability.

Advantageously, this invention provides a remote control decoy adaptable for different types of waterfowl.

Advantageously, this invention provides means for remotely controlling a plurality of decoys utilizing a single transmitter.

Advantageously, this invention provides a remote controlled decoy with forward, reverse and narrow radius turning capabilities.

Advantageously, this invention provides a remote controlled decoy with improved waterfowl attractant system.

Advantageously, this invention provides an improved method of laying and retrieving decoys.

Advantageously, in the preferred embodiment of this invention, a remote controlled decoy is provided with two propellers, each independently controlled by a different joystick of a transmitter. The transmitter is adjustable to allow the transmitter to control a plurality of different decoys, which may also be adapted to tow a non-powered decoy, to produce a realistic courting action. The decoy is also preferably provided with a strobe light to simulate the flapping of wings at great distances.

Advantageously this invention provides an improved waterfowl attracting system utilizing strobe lights to simulate wing action. The lights may be turned on when waterfowl are at a great distance, and turned off when the waterfowl comes closer.

BRIEF DESCRIPTION OF THE DRAWINGS

The present invention will now be described, by way of example, with reference to the accompanying drawings in which:

FIG. 3 illustrates a bottom perspective view in partial cutaway of the shell of the decoy being removed from the hull;

FIG. 4 illustrates a bottom perspective view of a supplemental shell representing a different waterfowl;

FIG. 5 illustrates a top perspective view of a hunting scenario, shown with multiple decoys being controlled by a single transmitter;

DETAILED DESCRIPTION OF THE PREFERRED EMBODIMENT

Figure 1:
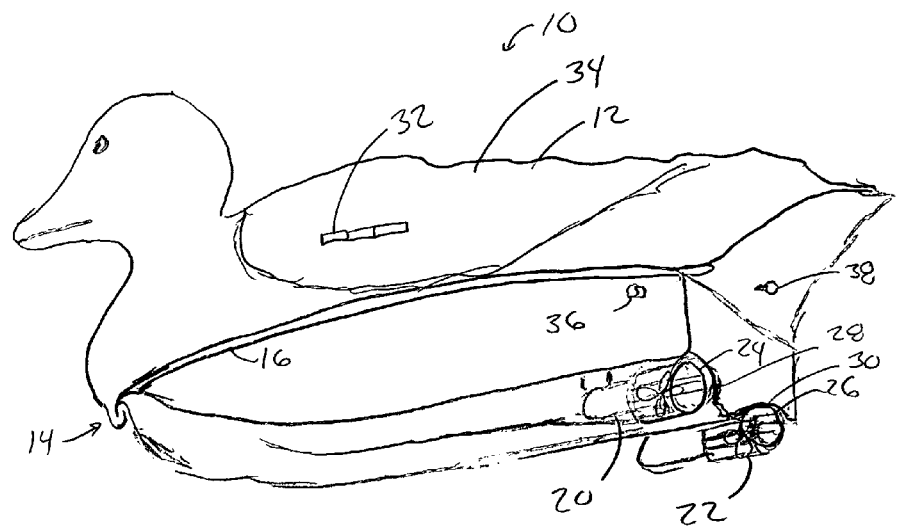
FIG. 1 illustrates a bottom perspective view of the remote controlled decoy of the present invention.

A remote controlled decoy according to this invention is shown generally as (10) in FIG. 1. The decoy includes a shell (12), preferably formed of any material known in the art for producing decoys, but is preferably resilient and colored to resemble the coloring of an actual waterfowl. As shown in FIG. 1, the shell (12) is formed and colored to resemble a mallard hen. The shell is preferably provided with a hook (14), formed of metal or similarly strong material. As shown in FIG. 1, the hook (14) overhangs and engages a lip (16) provided along a perimeter of a rigid plastic hull (18) to maintain the shell (12) in contact with the hull (18).

As shown, the hull (18) is provided with a first propeller (20) and a second propeller (22). The first propeller (20) is preferably provided within a first weed cage (24) and the second propeller (22) is provided within a second weed cage (26). The weed cages (24) and (26) may be constructed of any suitable material, but are preferably constructed of a rigid plastic material formed to define openings narrow enough to prevent the ingress of large weeds into contact with the propellers (20) and (22), yet large enough to limit a significant loss of power associated with reduced flow of water into contact with the propellers (20) and (22). Although the hull (18) may be of any desired shape, it is preferably injection molded of plastic to provide a first recess (28) and second recess (30), to accommodate the first propeller (20) and second propeller (22). As shown in FIG. 1, the shell (12) is provided on its surface with a plurality of small strobe lights (32). The strobe lights (32) may be of any suitable type known in the art, but are preferably located near the wing (34) of the decoy (10).

Figure 2:
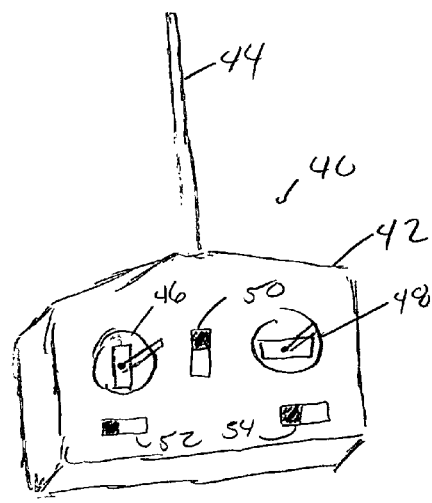
FIG. 2 illustrates a bottom perspective view of the transmitter associated with the remote controlled decoy of the present invention.

Located on the hull (18) is an on/off switch (36), which may alternatively be located in any desired location. Provided on the shell (12) is an eyelet (38) for a purpose described below. Shown in FIG. 2 is a transmitter (40) utilized in association with the decoy (10) of the present invention. As shown in FIG. 2, the transmitter (20) is of a standard type known in the art to produce radio frequency signals. The transmitter

(40) is preferably provided with a housing (42) and an antenna (44). Coupled to the housing (42) is a first joystick (46) and a second joystick (48). Also provided on the transmitter (40) is an on/off switch (50), a radio frequency switch (52) and a strobe switch (54). Although the transmitter (40) may be constructed of any suitable type known in the art, it is preferably designed to operate on the frequencies 27 MHz and 49 MHz.

If it is desired to remove the shell (12) for replacement, or to access batteries (56) provided within the hull (18), the shell (12) may be removed from the hull (18). As shown in FIG. 3, the shell (12) is preferably provided with a hollow interior (58), a first inwardly directed ear (60) and a second inwardly directed ear (62). Although the ears (60) and (62) may be constructed of metal, in the preferred embodiment they are constructed of a material similar to that used to construct the shell (12). The ears (60) and (62) are preferably provided with a latch and hook material (64) which fits into mating engagement with hook and latch material (66) coupled to the hull (18). While the hook (14) and ears (60) and (62) serve to secure the shell (12) to the hull (18), in the preferred embodiment, the coupling is not watertight but, instead, is merely overlapping to allow moisture contacting the back (68) of the shell (12) to roll downward across the shell (12) and away from the hull (18). Preferably, the hull (18) itself is substantially watertight, with the batteries (56) and other electrical components being protected from moisture, regardless of whether or not the shell (12) is attached to the hull (18).

Shown in FIG. 4 is a supplemental shell (70) similar in all respects to the shell (12), except that the shell (70) is configured in size, shape and coloring to resemble a teal, rather than a mallard hen. If it is desired to adjust the decoy (10) to resemble a teal, the hook (72) is provided over the lip (16) of the bare hull (18), and the supplemental shell (70) is rotated onto the hull (18) until the supplemental ears (74) and (76) contact the hook and latch material (66) of the hull (18), thereby securing the supplemental shell (70) to the hull (18). FIGS. 3-4.

As shown in FIG. 5, when it is desired to utilize the decoy (10) of the present invention, a hunter (78) merely actuates the on/off switch (36) of the decoy (10), and the on/off switch (50) of the transmitter (40), and sets the decoy (10) into the water (80). FIGS. 1, 3 and 5. The hunter (78) thereafter utilizes the joysticks (46) and (48) to control the speed of the propellers (20) and (22) to motivate the decoy (10) into a desirable position. As shown in FIG. 5, the decoy (10) may be utilized in association with static decoys (82), such as those known in the art, which may be tethered utilizing an anchor line (84) in a manner such as that known in the art.

Alternatively, or additionally, a supplemental decoy (86) may be utilized and configured similarly to that described above in association with the decoy (10). As shown in FIG. 5, the supplemental decoy (86) is provided with a mallard hen shell (88) and is coupled through an eyelet (90) via fishing line (92) or similar connection means to an eyelet (94) provided on a standard decoy (96), which is configured to resemble a mallard drake. Preferably, the supplemental decoy (86) is designed to operate in response to a 49 MHz signal, while the decoy (10) is designed to operate on a 27 MHz signal. Accordingly, the hunter (78) may utilize the radio frequency switch (52) on the transmitter (40) to toggle back and forth between controlling the supplemental decoy (86) and decoy (10), utilizing the joysticks (46) and (48) of the transmitter (40). In this manner, the hunter may control a single decoy or a double decoy combination configured to resemble a mating pair.

If it is desired to attract waterfowl from a long distance, the hunter (78) may actuate the strobe switch (54) which causes the strobe lights (32) to strobe at a predetermined frequency and intensity desired by the hunter (78), in accordance with the type of waterfowl being harvested and the specific conditions associated with the particular harvest. If desired, the strobe lights (32) may be configured to remain in either an actuated or deactuated state until specifically actuated or deactuated by the hunter (78). In this manner, the hunter (78) may actuate the strobe lights (98) of the supplemental decoy (86) simultaneously, utilizing the radio frequency switch (52) and strobe switch (42) of the transmitter (40). Preferably, the hunter actuates the strobe lights (32) and (98) when waterfowl (100) can be seen at a distance. The hunter (78) may maintain the strobe lights (32) and (98) actuating until the waterfowl (100) are close enough to be attracted by the realistic movement of the decoy (10) and supplemental decoy (86). At this point, the strobe lights (32) and (98) are preferably shut off to prevent the waterfowl (10) from flaring and exiting the area upon recognition of the strobe lights (32) and (98) not being actual feather movement of real waterfowl.

After the harvest has been completed, the hunter (78) merely utilizes the transmitter (42) to direct the decoy (10) and supplemental decoy (86) back to the hunter (78), where they may be retrieved. If static decoys (82) are utilized, the hunter (78) must still go retrieve these decoys in a manner such as that known in the art.

Figure 6:
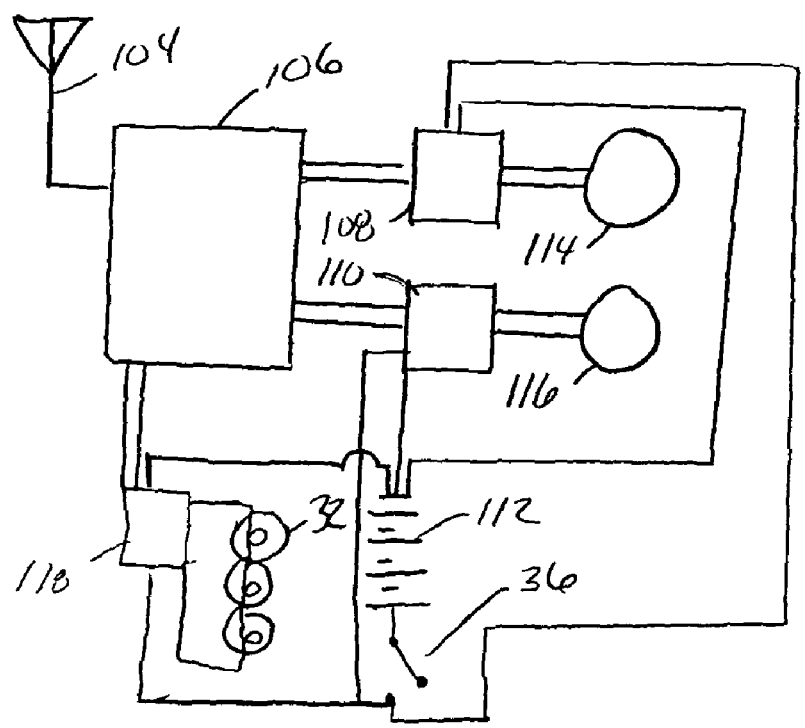
FIG. 6 illustrates a schematic of the electronics associated with the decoy of the present invention.

A schematic of the electronics provided within the hull (18) is shown generally as (102). As shown, an antenna (104) is coupled to a receiver (106), such as those well known in the art for use in association with remote control cars and boats. The receiver (106) in turn is coupled to a first motor controller (108) and a second motor controller (110). The motor controllers (108) and (110) are coupled to a battery (112) which is sufficiently powerful to motivate the motors (114) and (116) coupled to the motor controllers (108) and (110) and the propellers (20) and (22). FIGS. 1 and 6. The motor controllers (108) and (110) are of a type known in the art to attenuate the supply of power from the battery (112) to the motors (114) and (116) in response to signals received from the receiver (106), which, in turn, are provided by the transmitter (40) in response to manipulation of the joysticks (46) and (48) by the hunter (78). The motors (114) and (116) are separately controlled to drive the propellers (20) and (22) at different speeds to cause the decoy to turn in response to differential movements of the joysticks (46) and (48). Also, as shown in FIG. 6, the receiver (106) is coupled to a light controller (118) which, in turn, is coupled to the strobe lights (32) and to the battery (112) to actuate and deactuate the strobe lights (32) in response to signals received from the receiver (106). As shown in FIG. 6, the battery (112) is coupled to the on/off switch (36). As noted above, the electronics associated with the receiver (106), except the strobe lights (32), are contained within the hull in a watertight manner.

Figure 7:
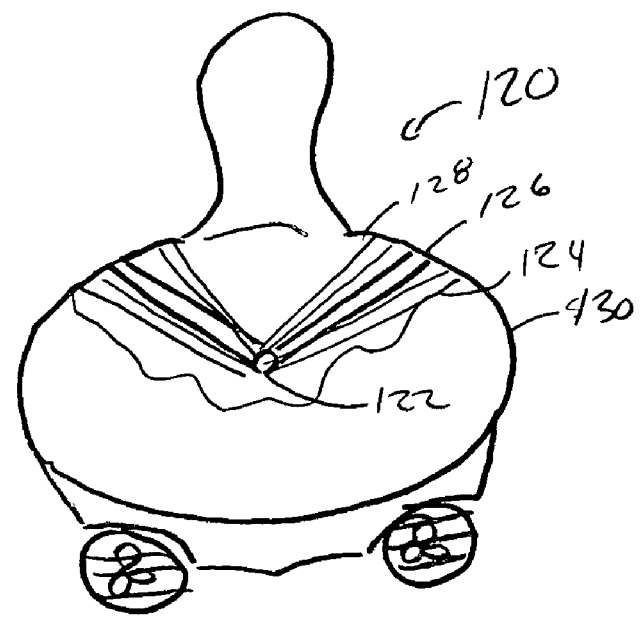
FIG. 7 illustrates a rear perspective view of an alternative embodiment of the present invention, shown in partial cutaway to reveal an alternative arrangement to mount the strobes in the decoy.

An alternative embodiment of the present invention is shown generally as (120) in FIG. 7. In this embodiment, a single, powerful strobe light (122) is in communication with a plurality of tapered bores (124) opening into holes (126) provided on the back (128) of the shell (130) of the alternative embodiment of the decoy (120). In this manner, a single strobe light (122) may be used to direct light to a plurality of holes (126) to give the illusion of a plurality of lights and, from a distance, wing movement.

Figure 8:
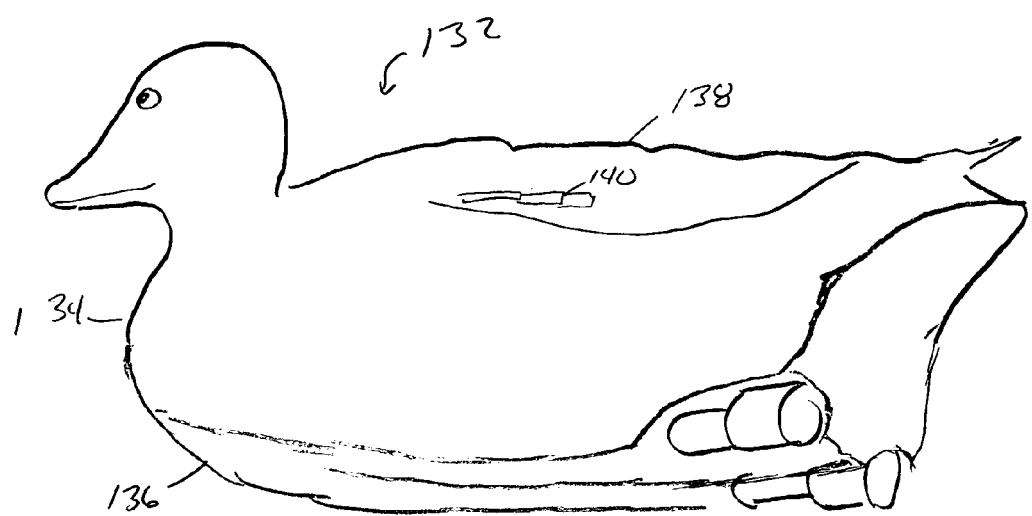
FIG. 8 illustrates another alternative embodiment of the present invention, utilizing a shell integrally formed with the hull.

Another alternative embodiment of the instant invention is shown generally as (132) in FIG. 8. As shown, the shell (134) is integrally formed with the hull (136) to make the decoy (132) even more realistic and to provide the decoy with even greater protection against water seeping into the decoy (132). In this embodiment, the back (138) preferably lifts up to reveal the interior of the decoy (132) to allow for access to the propeller motors, batteries, switch (not shown), and strobe lights (140). The back (138) is preferably constructed of the same material as the shell (134). The back (138) may be easily lift and allowed to resiliently return to its former state when released.

Although the invention has been described with respect to the preferred embodiment thereof, it is to be understood that it is not to be so limited, since changes and modifications can be made therein which are within the full, intended scope of this invention as defined by the appended claims. For example, it is anticipated that the hull (18) of the present invention may be utilized without the shell (12) for recreational use and may be modified to resemble a model watercraft. It is additionally anticipated that the decoy (10) may be programmed to follow a predetermined course or tethered to a line instead of, or in addition to, being remotely controlled by the transmitter (40). It is also anticipated that any number of decoys may be controlled with differing frequencies utilized by the transmitter (40). It is also anticipated that a plurality of decoys may be controlled simultaneously on a single frequency using the transmitter to cause the decoys to make simultaneous movements.

What is claimed is:
1. A radio controlled decoy system comprising:
(a) a decoy;
(b) a first motor coupled to said decoy;
(c) a first propeller coupled to said first motor;
(d) a second motor coupled to said decoy;
(e) a second propeller coupled to said second motor;
(f) means for generating a radio signal;
(g) means coupled to said first motor and to said second motor for actuating said first motor in response to said radio signal;
(h) wherein when said decoy is placed on water, a majority of said first propeller and a majority of said second propeller are under said water;
(i) means for generating a first radio signal and a second radio signal;
(j) wherein said actuating means is means for actuating said first motor in response to said first radio signal;
(k) means coupled to said decoy for directing a first strobing light in a first direction and a second strobing light in a second direction; and
(l) further comprising means for actuating said directing means in response to said second radio signal.
2. A radio controlled decoy system comprising:
(a) a decoy;
(b) a first motor coupled to said decoy;
(c) a first propeller coupled to said first motor;
(d) a second motor coupled to said decoy;
(e) a second propeller coupled to said second motor;
(f) means for generating a radio signal;
(g) means coupled to said first motor and to said second motor for actuating said first motor in response to said radio signal;
(h) wherein when said decoy is placed on water, a majority of said first propeller and a majority of said second propeller are under said water;
(i) a supplemental decoy;
(j) a third motor coupled to said supplemental decoy;
(k) a third propeller coupled to said third motor;
(l) a fourth motor coupled to said supplemental decoy;
(m) a fourth propeller coupled to said fourth motor;
(n) wherein said generating means is means for generating a first radio signal and a second radio signal;
(o) wherein said actuating means is means for actuating said first motor in response to said first radio signal; and
(p) supplemental means coupled to said third motor and said fourth motor for actuating said third motor in response to said second radio signal.
3. The radio controlled decoy system of claim 2, further comprising turning said first propeller and said second propeller at different speeds.
4. The radio controlled decoy system of claim 3, further comprising a strobe light coupled to said decoy.
5. The radio controlled decoy system of claim 3, further comprising means coupled to said decoy for directing a first strobing light in a first direction and a second strobing light in a second direction.
6. The radio controlled decoy system of claim 2, further comprising means for reversing said first motor and said second motor.
7. The radio controlled decoy system of claim 2, further comprising means for towing said supplemental decoy behind said decoy.
8. The radio controlled decoy system of claim 2, further comprising:
(a) a second supplemental decoy;
(b) means for towing said second supplemental decoy behind said decoy;
(c) a third supplemental decoy; and
(d) means for towing said third supplemental decoy behind said supplemental decoy.
9. A radio controlled watercraft system comprising:
(a) a hull;
(b) a first motor coupled to said hull;
(c) a first propeller coupled to said first motor;
(d) a second motor coupled to said hull;
(e) a second propeller coupled to said second motor;
(f) means for generating a first electromagnetic signal;
(g) means for generating a second electromagnetic signal;
(h) means coupled to said first motor for actuating said first motor in response to said first electromagnetic signal;
(i) means coupled to said second motor for actuating said second motor in response to said second electromagnetic signal;
(j) wherein when said hull is placed on water, a majority of said first propeller and said second propeller are under said water;
(k) a supplemental hull;
(l) a third motor coupled to said supplemental hull;
(m) a third propeller coupled to said third motor;
(n) a fourth motor coupled to said supplemental hull;
(o) a fourth propeller coupled to said fourth motor;
(p) means for generating a third electromagnetic signal;
(q) means for generating a fourth electromagnetic signal;
(r) means coupled to said third motor for actuating said third motor in response to said third electromagnetic signal;
(s) means coupled to said fourth motor for actuating said fourth motor in response to said fourth electromagnetic signal; and
(t) a housing containing said first generating means, said second generating means, said third generating means and said fourth generating means.
10. The radio controlled watercraft system of claim 9, further comprising a replica of a waterfowl coupled to said hull.
11. The radio controlled watercraft system of claim 9, further comprising a first replica of a first waterfowl, a second replica of a second waterfowl, and means for releasably securing to said hull a replica selected from a set consisting of said first replica and said second replica.

12. The radio controlled watercraft system of claim 9, further comprising means for reversing said first motor and said second motor.

13. The radio controlled watercraft system of claim 9, further comprising a self-contained battery pack coupled to said first motor.

14. The radio controlled watercraft system of claim 9, further comprising:
   (a) a first controller coupled to said first electromagnetic signal generating means and to said third electromagnetic signal generating means; and
   (b) a second controller coupled to said second electromagnetic signal generating means and to said fourth electromagnetic signal generating means.

15. The radio controlled watercraft system of claim 14, further comprising means coupled to said first controller and said second controller for switching between a first condition and a second condition, where when in said first condition said first controller actuates said first electromagnetic signal generating means and said second controller actuates said second signal generating means, and wherein when in said second condition said second controller actuates said third electromagnetic signal generating means and said second controller actuates said fourth signal generating means.

16. The radio controlled watercraft system of claim 9, further comprising:
   (a) a first cage provided around said first propeller; and
   (b) a second cage provided around said second propeller.

17. The radio controlled watercraft system of claim 9, further comprising:
   (a) a decoy; and
   (b) means for towing said decoy behind said hull.

18. The radio controlled watercraft system of claim 9, further comprising a strobe light coupled to said hull.

\* \* \* \* \*